United States Patent [19]
Ostertag et al.

[11] Patent Number: 4,867,795
[45] Date of Patent: * Sep. 19, 1989

[54] PLATELETLIKE PIGMENTS BASED ON IRON OXIDE

[75] Inventors: Werner Ostertag, Gruenstadt; Norbert Mronga, Dossenheim, both of Fed. Rep. of Germany

[73] Assignee: BASF Aktiengesellschaft, Ludwigshafen, Fed. Rep. of Germany

[*] Notice: The portion of the term of this patent subsequent to May 2, 2006 has been disclaimed.

[21] Appl. No.: 165,494

[22] Filed: Mar. 8, 1988

[30] Foreign Application Priority Data

Mar. 20, 1987 [DE] Fed. Rep. of Germany ....... 3709217

[51] Int. Cl.$^4$ ................................................ C09C 1/24
[52] U.S. Cl. .................................... 106/459; 106/415; 423/599
[58] Field of Search .................. 106/459, 415; 423/599

[56] References Cited

U.S. PATENT DOCUMENTS 3,926,659 12/1975 Bernhard et al. .
4,285,726 8/1981 Hund et al. .................... 106/14.05
4,404,254 9/1983 Franz et al. .
4,623,396 11/1986 Kimura et al. .
4,676,838 6/1987 Franz et al. .

FOREIGN PATENT DOCUMENTS 0068311 2/1985 European Pat. Off. .
57-49667 3/1982 Japan ................................ 106/304

Primary Examiner—Paul Lieberman
Assistant Examiner—Christine A. Skane
Attorney, Agent, or Firm—Keil & Weinkauf

[57] ABSTRACT

Plateletlike pigments based on iron oxide and having a spinel structure of the composition:

$$Mn_u Al_v Fe_{[3-(u+v)]-z} O_{4-z},$$

where
u is from 0.01–0.09,
v is from 0–0.3 and
z is from 0–1.

The pigments can be used for producing decorative coatings, in particular in paints, plastics, prints and cosmetics, for producing electromagnetic screens, as substrates for coatings and as pigments having magnetic properties.

15 Claims, No Drawings

PLATELETLIKE PIGMENTS BASED ON IRON OXIDE

The present invention relates to effect pigments which form on reducing hydrothermally produced platelet-like $Mn_xAl_yFe_{2-(x+y)}O_3$ pigments.

The optical effect of effect or luster pigments is due to directional reflection at sheetlike, aligned pigment particles having a high refractive index. The average particle diameter of effect or luster pigments is substantially greater than that of pigments whose effect is due to scattering and absorption. The average particle diameter determines the nature of the effect, which in the case of platelets of small diameter, gives a silky soft appearance and in the case of platelets of large diameter lends a typical sparkle.

Effect pigments can be of metallic or oxidic nature. Plateletlike aluminum pigments have been known for a long time. Oxidic based effect pigments have lately attracted increasing interest, for example for automotive coatings, where they represent a visually attractive alternative to the long-established plateletlike aluminum pigments. Oxidic effect pigments are even used for plastics coloration, in printing or in cosmetics, ie. in all sectors where high luster is desirable. Oxidic effect pigments are for example hydrothermally produced platelet-like iron oxide or iron oxide mixed phase pigments where the pigment particles have monocrystal character. The prior art oxidic effect pigments also include the mica flake pigments coated with a highly refractive material, which are referred to as nacreous or pearl luster pigments.

Aside from colored effect pigments there is also a demand for effect pigments which are all but colorless or even achromatic, in particular black or blackish. This is true in particular for applications in the automotive sector, where paint stylists are looking for the black pearl, but also in cosmetics and ceramics and for plastics pigmentations and decorative coatings.

There has been no shortage of attempts at producing black or dark effect pigments.

For instance, DE-C-2,313,331 describes mica flake pigments which have a coat of polycrystalline magnetite and which, depending on the thickness of the coating, have a mouse-gray to black appearance. Owing to the polycrystalline structure of the coating, such effect pigments, however, do not show the gloss and the surface properties of hydrothermally synthesized plateletlike pigments where the smooth crystal surfaces of the substantially monocrystalline particles play a part in the optical effect.

The same applies to the mica flake pigments described in DE-A-3,433,657, which are coated with a reduced $TiO_2$ layer.

EP-C-14,382 mentions products of the structure of magnetite and maghemite which are preparable from hydrothermally synthesized hematite precursor crystals doped with elements from main groups IV, V and VI and/or subgroup II of the periodic table. However, these precursor crystals only have a small average diameter, so that it is difficult, if not impossible, to obtain the sparkle effect, where individual particles in the coating are visible to the naked eye. This is substantially true also of the precursor crystals described in DE-A-3,440,911, which have been somewhat increased in size by means of complicated nucleating processes.

U.S. patent application No. 011/111,602 describes plateletlike pigments based on the general formula $Mn_xAl_yFe_{2-(x+y)}O_3$, where x is 0.01–0.06 and y is 0–0.2. These mixed phase oxide pigments crystallize in a hematite lattice. They can be produced in a simple manner in a hydrothermal process by subjecting an aqueous suspension of iron(III) hydroxide or oxide hydrate in the presence of alkali metal hydroxides or carbonates and in the presence of manganese compounds which are soluble in the reaction medium to a treatment at above 120° C., preferably at 250°–360° C. Surprisingly, manganese is incorporated in the course of this treatment into the plateletlike ternary oxide mixed phase pigment of the general formula $Mn_xAl_yFe_{2-(x+y)}O_3$ which forms.

Manganese compounds which are soluble in the reaction medium comprise the compounds of hexavalent and in particular heptvalent manganese, for example potassium permanganate.

Iron hydroxide or oxide hydrate comprises not only gellike $Fe(OH)_3$ but also $\alpha$-FeOOH and $\gamma$-FeOOH. The concentration or solids content of the suspension is advantageously chosen in such a way that the suspension can be handled industrially without problems; in general, the suspension contains from 1 to 20, preferably from 1 to 10, % by weight of iron hydroxide or oxide hydrate, based on water.

The amount of manganese compound soluble in the reaction medium is chosen in such a way that the atomic ratio Mn:Fe is not less than the atomic ratio in the pigment to be produced. In general, it has to be stated that, as the concentration of manganese in the suspension increases, given otherwise identical reaction conditions, not only does the manganese content in the ready-prepared pigment increase but also the average particle diameter of the pigment, with substantially no change in the diameter/thickness ratio. Control of the concentration of the manganese compound in the suspension thus provides a means of producing pigments of specific particle diameter within the range from 6 to 65 $\mu$m.

If the pigments are also to contain aluminum, suspensions are used which contain alkali metal aluminates. It will be readily understood that the alkali metal aluminate need not be used as such; instead, it is also possible to use aluminum oxide, which is converted into alkali metal aluminate under the hydrothermal conditions, or an aluminum oxide hydrate. The Al:Fe atomic ratio in the starting reactants, like the Mn/Fe ratio, must likewise be not less than the Al/Fe atomic ratio in the pigment to be produced.

The metallically lustrous pigments have a small particle diameter of around 10 $\mu$m and a reddish yellow color which, with increasing diameter, shifts towards violet.

It is an object of the present invention to provide highly lustrous dark or black plateletlike effect pigments (and the process for producing same) which have a high shape factor, ie. a high diameter/thickness ratio, and average particle sizes from 5 to 60 $\mu$m and which are variably settable in color intensity and hue via the manufacturing conditions.

We have found that this object is achieved with plateletlike mixed phase pigments having a spinel structure of the composition $Mn_uAl_vFe_{3-[(u+v)]}O_{4-z}$, where u is 0.01–0.09, v is 0–0.3 and z is 0–1.

The pigments according to the invention can be produced by reducing the pigments of the general formula $Mn_xAl_yFe_{2-(x+y)}O_3$ described in U.S. patent application No. 011/111,602. On complete reduction, the pigments according to the invention are structurally uniform and crystallize in a spinel lattice; on incomplete reduction, they are two-phased, with the spinel structure of the reduced phase on the surface of the particle and the hematite structure of the starting material in the core of the particle.

Surprisingly, the external shape of the particles, ie. the habit, is preserved despite the lattice modification due to the reduction. The platelet size and shape of the pigments according to the invention are decided by the $Mn_xAl_yFe_{2-(x+y)}O_3$ pigment starting material and are specifically adjustable by the manufacturing conditions for this pigment.

The production of the pigments according to the invention starts from the pigments of the general formula $Mn_xAl_yFe_{2-(x+y)}O_3$ described in U.S. patent application No. 011/111,602, which is incorporated herewith by reference, the manufacturing conditions being varied to produce starting pigments of specifically adjustable platelet dimensions and shape. These pigments are subjected at elevated temperatures to a treatment with reducing gases or compounds which at the treatment temperature are present in the vapor form. Suitable reducing gases, besides hydrogen in particular, also include ammonia, carbon monoxide, methane and other gaseous hydrocarbons or alcohols. The temperature range for the reduction extends from 200° C. to very high temperatures of above 1,200° C. The upper temperature range is essentially only determined by the durability of the reduction vessels. Advantageously, the reduction is carried out at from 300° to 800° C. To ensure that the reduction is certain to stop at the spinel phase and the composition limit $Mn_uAl_vFe_{[3-(u+v)]}O_4$, and does not go further to lead to lower oxides or even to the metal, the reaction gas is advantageously diluted with steam, the proportion of steam increasing with the temperature of the reduction. In general, it is sufficient to use a reduction gas stream saturated for example at from 20° to 85° C. with steam or water vapor. Excessive reduction should be avoided if only because for example a reduction to the metallic phase can easily lead to breakage of the pigments. To avoid this it is further essential that the reduction be carried out with minimum mechanical stress on the pigment.

Depending on the size of the starting pigments used and on the duration of the reduction, the pigments obtained are fully converted, ie. they exclusively have a spinel structure of the composition $Mn_uAl_vFe_{[3-(u+v)]}O_4$, or they are not fully converted and are in two phases with the spinel structure of the composition mentioned only on the surface while the unconverted core has the hematite structure of the starting pigment and the composition $Mn_xAl_yFe_{2-(x+y)}O_3$.

The degree of reduction is specifically adjustable via the parameters reduction temperature and reduction time. The higher the reduction temperature, the shorter the reduction time. In the production of two-phase pigments it is advantageous to employ reduction temperatures which are not too high since the degree of reduction is more easily controllable at lower reduction temperatures.

Plateletlike pigments having a spinel structure of the composition $Mn_uAl_vFe_{[3-(u+v)]-z}O_{4-z}$ where z is >0 to 1 are very difficult to obtain by direct reduction. To produce this type of pigment it is preferable to start from fully converted pigments and to treat them gently at from 150° to 400° C. with air which may optionally have been diluted with further nitrogen to reduce its $O_2$ content to <20% by volume. The oxidation can be continued until finally a product is obtained again which, in respect of its composition, corresponds to the starting pigment but which instead of a hematite structure has a maghemite structure. Maghemite is structurally likewise a spinel.

Aside from a specifically settable particle size the pigments according to the invention have the advantage of a variable hue and of a variable color intensity. It is known that with black pigments based on iron oxide the addition of Mn has a color-intensifying effect, while Al additives have a lightening action. Hue and color intensity variations are additionally obtainable via particle size variation and in a wide range via variation of the extent of reduction. For instance, the above-described two-phase pigments have a different color if the outer spinel layer is thin than if it is thick. Such variations in hue and color intensity are particularly desirable in all decorative coatings sectors and in cosmetics. The pigments according to the invention can be used here solo, as bases for coatings, or admixed with other color or effect pigments. It is particularly for admixtures with other color or effect pigments that scope for varying the hue and intensity of the effect pigments according to the invention is desirable, since their different spectral absorption properties makes possible a substantial variation in the overall visual impression.

However, the pigments according to the invention are interesting not just because of their optical properties. They also show electrical and magnetic properties which make them attractive for use in numerous technical fields.

Such technical application areas may be found for example in the electromagnetic screening with pigments, in solar energy exploitation, in magnetic data carriers and in magnetic engineering materials such as plastoferrites.

By coating the product according to the invention with highly refractive oxides such as $TiO_2$ or $Fe_2O_3$ it is possible to produce further coloristically interesting effect pigments.

The Examples which follow serve to illustrate the invention in further detail. The percentages are by weight, unless otherwise stated.

(A) Production of $Mn_xAl_yFe_{2-(x+y)}O_3$ starting pigment

EXAMPLE A1

A thoroughly stirred mixture of 9.37 g of $\alpha$-FeOOH obtained by oxidation of $FeSO_4$ with air in a two-stage process and whose BET surface area is 42 m$^2$/g, 6.98 g of $Al(OH)_3$, 6.05 g of NaOH and 150 g of $H_2O$ are treated with 1.33 g/l of $KMnO_4$ and, in a 300 ml capacity electrically heated stirred autoclave, heated with stirring to 220° C. in the course of 30 minutes (heating-up phase) and then to 305° C. in the course of a further 30 minutes (reaction phase). The mixture is then cooled to temperatures below 100° C. in the course of 10 minutes. The solid reaction product is separated from the alkaline solution, washed with hot water and dried at 110° C. in a drying cabinet. The pigment obtained has a dark violet color and substantial luster and comprises plateletlike crystals having smooth surfaces, as revealed by scanning electron micrographs.

The average particle diameter is found to be 18$\mu$ by Cilas laser beam diffraction granulometry and the average platelet thickness is determined from measurements of the specific free surfaces area (BET value) of the pigment as $0.2\mu$. The platelets accordingly have a diameter: thickness ratio of 90.

Wet chemical analyses reveal that the pigment has an Mn content of 1.2%, an Al content of 2.2% and an Fe content of 65.6%. The pigment accordingly has a composition conforming to the formula $Mn_{0.034}Al_{0.128}Fe_{1.838}O_3$. X-rayograms reveal that the product is present in single phase and has a hematite structure.

EXAMPLE A2

A mixture of 9.5 g of $\alpha$-FeOOH which has been prepared by oxidation of an aqueous $FeSO_4$ solution in a two-stage process and has a BET surface area of 45 $m^2/g$, 8.48 g of $NaAlO_2$, 4.2 g of KOH, 0.15 g of $KMnO_4$ and 150 g of $H_2O$ is heated with stirring to 310° C. in a 300 ml capacity electrically heated autoclave in the course of 30 minutes. Following a delay time of 10 minutes the mixture is cooled down. The plateletlike solid reaction product is separated from the aqueous solution, washed with hot water and dried at 105° C. in a drying cabinet.

The pigment obtained has a brownish yellow color, shows metallic luster and consists of plateletlike crystals. Scanning electron micrographs show smooth, clean crystal surfaces on the monocrystals. The average diameter of the crystalline particles is $10\mu$, and the specific surface area (BET value) is 3.8 $m^2/g$, from which the average particle thickness can be calculated to be $0.1\mu$.

Analyses reveal a chemical composition of the product conforming to $Mn_{0.02}Al_{0.18}Fe_{1.80}O_3$. X-rayograms reveal that the product is present in single phase and has the X-ray lines of hematite.

EXAMPLE A3

A mixture of 10 g of $\alpha$-FeOOH which has been prepared by oxidation of an aqueous $FeSO_4$ solution with air in a two-stage process and has a BET surface area of 43 $m^2/g$ is intimately mixed with 7.0 g of $Al(OH)_3$, 6.0 g of NaOH, 0.40 g of $KMnO_4$ and 155 ml of $H_2O$, and the resulting mixture is heated with stirring in a 300 ml stirred autoclave to 225° C. in the course of 30 minutes and to 310° C. in the course of a further 30 minutes. This is followed by cooling down. The reaction product is separated from the aqueous solution by filtration, washed with hot water and dried at 105° C. in a drying cabinet.

The pigment obtained has a dark violet color. Sparkling monocrystals are visible in the powder to the naked eye. Scanning electron micrographs show cleanly crystallized platelets having high diameter:-thickness ratios. Cilas measurements reveal an average particle diameter of $34.1\mu$. From the BET value of 0.95 $m^2/g$ it is possible to calculate an average thickness for the particles of $0.4\mu$.

Analyses reveal a pigment composition conforming to the formula $Mn_{0.05}Al_{0.15}Fe_{1.80}O_3$. X-rayograms show a crystalline product in single phase which shows the diffraction lines of hematite.

EXAMPLES A4 TO A10

Examples A4–A10 are carried out analogously to Example 1 using the reactant quantities listed in Table 1. In all the Examples, the temperature is raised from room temperature to 220° C. in the course of 30 minutes. Heating is then continued, as in Example A1, to 305° C. in the course of a further 30 minutes, which is followed without an additional delay period by cooling down in air. In Examples A9 and A10, the 30-minute heating-up period to 305° C. is followed by a further delay period of 30 minutes at 305° C. before cooling down. The results of both runs are summarized in Table 1. All the reaction products are plateletlike, as revealed by scanning electron micrographs, and have the X-ray diffraction pattern of hematite.

TABLE 1

| | Plateletlike $Mn_xAl_yFe_{2-(x+y)}O_3$ pigments | | | | | | | |
|---|---|---|---|---|---|---|---|---|
| Ex- | Weight in g | | | | | | Pigment platelets | | |
| ample | FeOOH | Al(OH)₃ | NaOH | KMnO₄ | H₂O | Product composition | $V(\mu)^2$ | $d(\mu)^2$ | V/d |
| A4 | 6.25 | 6.98 | 6.0 | 0.08 | 150 | $Mn_{0.012}Al_{0.16}Fe_{1.828}O_3$ | 8.0 | 0.08 | 100 |
| A5 | 6.03 | 5.32 | 4.1 | 0.18 | 100 | $Mn_{0.03}Al_{0.18}Fe_{1.79}O_3$ | 28.0 | 0.29 | 96 |
| A6 | 6.25 | 6.98 | 6.0 | 0.50 | 150 | $Mn_{0.057}Al_{0.14}Fe_{1.803}O_3$ | 44.0 | 0.44 | 100 |
| A7 | 6.25 | 4.31 | 6.0 | 0.12 | 150 | $Mn_{0.020}Al_{0.08}Fe_{1.900}O_3$ | 12.2 | 0.30 | 41 |
| A8 | 6.25 | 0.20 | 6.0 | 0.11 | 150 | $Mn_{0.019}Al_{0.005}Fe_{1.976}O_3$ | 10.1 | 0.39 | 26 |
| A9 | 6.25 | 0 | 6.0 | 0.11 | 150 | $Mn_{0.018}Fe_{1.982}O_3$ | 10.0 | 0.39 | 26 |
| A10 | 6.25 | 0 | 6.0 | 0.40 | 150 | $Mn_{0.053}Fe_{1.947}O_3$ | 62.6 | 0.55 | 114 |

[1] Platelet diameter via laser beam diffraction measurements using CILAS granulometer.
[2] Platelet thickness calculated from BET surface area.

EXAMPLE A11

A thoroughly stirred suspension consisting of 55.9 g/l of FeOOH having a BET surface area of 42 $m^2/g$, 40.3 g/l of NaOH, 31.95 g/l of $\gamma$-$Al_2O_3$ and 1.5 g/l of $KMnO_4$ and water is pumped at a rate of 44 kg/h through a heated pressure pipe 20 mm in internal diameter and, in the course of pumping, is heated to 330° C. over 45 minutes. This is followed by cooling. The solid reaction product is separated from the alkaline solution, washed with hot water and dried at 110° C. in a drying cabinet.

The pigment has a reddish violet color and very high luster. It feels silkily soft and has strongly lubricating, lustrous properties. The average particle diameter is found to be $20.9\mu$ using Cilas laser beam diffraction granulometry. The average platelet thickness is calculated from measurements of the specific free surface area (BET) as $0.25\mu$.

Analysis reveals 64.4% of Fe, 3.2% of Al and 0.95% of Mn. X-rayograms indicate that the product is present in single phase and has a hematite structure. The product has the color quality values $L^* = 47.5$, $C_{ab} = 12.4$ and $H° = 34.0$.

Scanning electron micrographs confirm the platelet character of the pigment. The composition of the pigment is calculated to be $Mn_{0.027}Al_{0.184}Fe_{1.789}O_3$.

(B) Production of the $Mn_uAl_vFe_{[2-(u+v)]-z}O_{4-z}$ pigments according to the invention.

EXAMPLE B1

50 g of the plateletlike pigments produced as in Example A1 are introduced into a 2 l quartz flask equipped on the inside with 4 trip stages. The rotary flask is equipped with a gas inlet tube guided through the neck of the flask and projecting 10 cm deep into the flask. In the neck of the flask the gas inlet tube is accompanied by a gas discharge tube. The rotary flask is further equipped with a thermosensor for measuring the temperature of the contents.

The rotary flask is introduced into a collapsible, electrically heated jacket oven adapted to the shape of the flask and is initially flushed with $N_2$ while the jacket oven is heated up to the desired temperature at which the reduction is to take place. The temperature of the oven is controlled in such a way via a thermocouple-led system that the temperature of the contents during the reduction phase is 400° C.±5° C.

After the sample has been heated up to the reduction temperature of 400° C., 20 l/h of the reduction gas hydrogen which has been saturated at 75° C. with water vapor are introduced into the flask. The $N_2$ purge is discontinued.

The reduction is carried out over a period of 4 hours. During this time the flask is rotated in the oven at a rate of 35 r.p.m. During the entire reduction time, 20 l/h of $H_2O$-saturated $H_2$ gas flows through the flask. The jacket oven is then switched off. The reaction product is cooled down in the $H_2O$-saturated $H_2$ stream. After cooling down, the reaction product is ready for use without further aftertreatment.

The reaction product is black and shows very substantial luster. Scanning electron micrographs show that the platelet character of the starting pigment is not impaired by the reduction. The product, like the starting material, feels silkily soft and has strongly lubricating properties. Cilas granulometry indicates an average particle diameter of 17.5µ. X-rayograms show that the reaction product is uniformly crystalline and has a spinel lattice. The powder diagram resembles that of magnetite.

Analysis reveals 1.25% by weight of Mn, 2.3% of Al and 68.5% of Fe. On the basis of these values and the structural analysis the product can be assigned the formula $Mn_{0.051}Al_{0.192}Fe_{2.757}O_4$.

EXAMPLES B2 TO B10

Examples B2 to B10 are carried out analogously to Example B1, except for variation of the reduction temperature, the reduction gas and the reduction time. The reduction conditions and the results are summarized in Table 2.

TABLE 2

Plateletlike $Mn_xAl_yFe_{[3-(x+y)]-z}O_{4-z}$ pigments

| Example | Starting material for the reduction | Reduction gas | $H_2O$ saturation at | Reduction temperature | Reduction time | Composition | Structure | $V^1$ | color |
|---|---|---|---|---|---|---|---|---|---|
| B2 | $Mn_{0.02}Al_{0.18}Fe_{1.80}O_3$ as per Example A2 | $H_2$ | 85° C. | 450° C. | 2 h | $Mn_{0.03}Al_{0.27}Fe_{2.7}O_4$ | spinel | 10 µ | black |
| B3 | $Mn_{0.05}Al_{0.15}Fe_{1.80}O_3$ as per Example A3 | $H_2$ | 40° C. | 250° C. | 8 h | $Mn_{0.075}Al_{0.2}Fe_{2.7}O_4$ | spinel | 31 µ | deep black |
| B4 | $Mn_{0.012}Al_{0.16}Fe_{1.828}O_3$ as per Example A4 | $H_2$ | 70° C. | 350° C. | 5 h | $Mn_{0.018}Al_{0.24}Fe_{2.742}O_4$ | spinel | 8 µ | black |
| B5 | $Mn_{0.03}Al_{0.18}Fe_{1.79}O_3$ as per Example A5 | $NH_3$ | — | 700° C. | 1 h | $Mn_{0.0225}Al_{0.255}Fe_{2.7225}O_4$ | spinel | 27 µ | grayish black |
| B6 | $Mn_{0.057}Al_{0.14}Fe_{1.803}O_3$ as per Example A6 | $H_2$ | 75° C. | 370° C. | 4 h | $Mn_{0.0855}Al_{0.21}Fe_{2.7045}O_4$ | spinel | 42 µ | black |
| B7 | $Mn_{0.02}Al_{0.08}Fe_{1.90}O_3$ as per Example A7 | $H_2$ | — | 800° C. | 30' | $Mn_{0.03}Al_{0.12}Fe_{2.85}O_4$ | spinel | 12 µ | black |
| B8 | $Mn_{0.019}Al_{0.005}Fe_{1.976}O_3$ as per Example A8 | $H_2$ | +50 l/h of $H_2O$ vapor | 850° C. | 30' | $Mn_{0.0285}Al_{0.0075}Fe_{2.964}O_4$ | spinel | 10 µ | black |
| B9 | $Mn_{0.018}Fe_{1.982}O_3$ as per Example A9 | $CH_4$ | 75° C. | 400° C. | 5 h | $Mn_{0.027}Fe_{2.973}O_4$ | spinel | 10 µ | black |
| B10 | $Mn_{0.053}Fe_{1.947}O_3$ as per Example A10 | $H_2$ | 60° C. | 330° C. | 5 h | $Mn_{0.0795}Fe_{2.9205}O_4$ | spinel | 59 µ | deep black |

[1]The average platelet diameter was determined by laser beam diffraction using a Cilas granulometer.

EXAMPLE B11

50 g of the product produced in Example B7 are heated up to 250° C. under nitrogen in the rotary flask apparatus described in Example B1 at 20 r.p.m. 4 l of air admixed with 30 l of nitrogen are then introduced into the flask over a period of 3 hours. This is followed by cooling.

The product is plateletlike according to scanning electron micrographs. It has the X-ray diagram of a spinel and analyzes as $Mn_{0.023}Al_{0.093}Fe_{2.22}O_{3.33}$. It is blackish brown.

EXAMPLE B12

50 g of the product produced in Example B9 are heated up to 270° C. under nitrogen in the rotary flask described in Example B1. A mixture of 30 l/h of $N_2$ and 5 l of air is then introduced over a period of 4 hours into the flask rotating at 30 r.p.m. This is followed by cooling.

The product is plateletlike according to scanning electron micrographs. It has the X-ray diagram of a spinel and analyzes as $Mn_{0.02}Fe_{2.23}O_{3.25}$. The pigment is dark brown.

EXAMPLE B13

50 g of the product produced in Example B8 are heated up to 250° C. under nitrogen in the rotary flask apparatus described in Example B1 at 25 r.p.m. A mixture of 20 l/h of $N_2$ and 10 l/h of air is then introduced over 6 hours. This is followed by cooling.

The product shows the X-ray diagram of a spinel, is plateletlike according to electron micrographs and analyzes as $Mn_{0.019}Al_{0.0052}Fe_{2.066}O_{3.09}$. The product is brown.

EXAMPLE B14

50 g of the product produced in Example A11 are reduced in the reduction apparatus described in Example B1 by a procedure analogous to that of run B1, the reduction temperature being 360° C. and the reduction time 2.5 hours. The reduction gas hydrogen is saturated with $H_2O$ vapor at 70° C.

The black product obtained is plateletlike, as scanning electron micrographs show. Cilas granulometric measurements reveal an average particle diameter of 21.0$\mu$. The X-ray diagram shows lines of magnetite and of hematite. The color quality values of the product are $L^*=34.8$, Cab=0.3 and H°=31.7. The magnetic values of the sample are $H_c=39.8$ KA/m $M_m/\phi=56$ nTm$^3$/g $M_r/\phi=19.7$ nTcm$^3$/g.

EXAMPLE B15

50 g of the product produced in Example A11 are reduced in the reduction apparatus described in Example B1 by a procedure analogous to that of run B1, the reduction temperature being 340° C. and the reduction time 1 hour. The reduction gas hydrogen is saturated beforehand with $H_2O$ vapor at 65° C.

The product obtained is plateletlike, as scanning electron micrographs show. Cilas granulometric measurements reveal an average particle diameter of 21.2$\mu$. The X-ray diagram shows lines of magnetite and of hematite. The color quality values of the product are L-=39.2, CAB=1.6 and H°=43.9.

The sample has the magnetic values $H_c=43.3$ KA/m, $M_m/\phi=23$ Tm$^3$/g and $M_r/\phi=9.1$ nTm$^3$/g. The electrical conductivity is $1.0\times10^{-2}$ S/cm.

EXAMPLE B16

50 g of the product produced in Example A11 are reduced by a procedure analogous to that of run B1 in the reduction apparatus described in Example B1, the reduction temperature being 250° C. and the reduction time 2 hours. The reduction gas hydrogen is saturated beforehand with $H_2O$ vapor at 40° C.

The product obtained is plateletlike, as scanning electron micrographs show. Cilas granulometric measurements reveal an average particle diameter of 21.2$\mu$. The X-ray diagram shows lines of magnetite and of hematite. The color quality values of the product are $L^*=46.3$, Cab=10.9 and H°=31.1.

The magnetic values of the products are a coercive force $H_c=23$ KA/m and the saturation magnetization $M_m/\phi=2$ nTm$^3$/g. In a melamine lacquer matrix the platelets are orientable by an external magnetic field.

EXAMPLE B17

50 g of the product produced in Example A11 are reduced by a procedure analogous to that of run B1 in the reduction apparatus described in Example B1, the reduction temperature being 400° C. and the reduction time 2 hours. The reduction gas hydrogen is saturated beforehand with $H_2O$ vapor at 75° C.

The product obtained is plateletlike, as scanning electron micrographs show. Cilas granulometric measurements reveal an average particle diameter of 25.1$\mu$. The X-ray diagram shows not only distinct lines of magnetite but also very weak lines of metallic iron. The color quality values of the product are $L^*=36.2$, Cab=0.5 and H°=75.5.

The magnetic properties of the product are $H_c=35.4$ KA/m, $M_m/\phi=61$ nTM$^3$/g and $M_r/\phi=19.8$ nTm$^3$/g. The electrical conductivity is $4.0\times10^{-1}$ S/cm.

EXAMPLE B18

30 g of the pigment produced in run B17 are introduced into 103.8 g of aqueous titanyl sulfate solution containing 5.2% of titanium and 49.7% of $H_2SO_4$ giving a suspension, to which a sodium carbonate solution comprising 23.34 g of $Na_2CO_3$ and 500 ml of $H_2O$ is added dropwise at room temperature. While the mixture is stirred, the temperature is raised to the boil and maintained at that level for 2 hours. 500 ml of hot water at 95° C. are then added over 1 hour, and heating at the boil is continued for a further hour. This is followed by cooling down. The pigment platelets coated with precipitated titanium oxide hydrate are filtered off, washed and dried at 120° C.

The product obtained has a violet color and is lustrous and on analysis is found to have a titanium content of 11.3%.

EXAMPLE B19

20 g of the pigment produced in run B17 are stirred into 100 ml of hot distilled water at 75° C. 13 ml of 10% strength $AlCl_3.6H_2O$ solution in water are then added in the course of 1 hour together with sufficient aqueous 10% strength sodium hydroxide solution for a pH of 5.0. The suspension is stirred for an hour. 35 ml of a 40% strength aqueous $FeCl_3$ solution are then added in the course of 7 hours. During this time the pH is maintained at 3.5 by metering in sodium carbonate. The pigment platelets are then filtered off, washed and dried and calcined at 850° C. in the course of 10 minutes.

The product obtained shows pigment surfaces coated with iron oxide. It has a golden hue.

EXAMPLE B20

The pigment produced in B17 is kneaded by means of a Brabender laboratory kneader at 210° C. into a butadiene rubber-modified styrene-acrylonitrile copolymer in the course of 15 minutes. The pigment/copolymer mixing ratio is 1:1.

The homogeneous mixtures are molded into sheets 2.5 mm in thickness. The sheets are used to produce test housings for EMI measurements.

The measurements show that the pigment has a substantial screening action.

We claim:
1. A plateletlike pigment based on iron oxide and having a spinel structure of the composition:

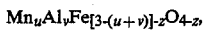

where
u is from 0.01–0.09,
v is from 0–0.3 and
z is from 0–1.
2. A plateletlike two-phase pigment, wherein the surfaces have a spinel structure of the composition:

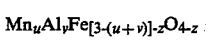

where
u is from 0.01–0.09,
v is from 0–0.3 and
z is from 0–1, and the core has a structure of hematite of the composition $$Mn_xAl_yFe_{2-(x+y)}O_3$$

where
x is from 0.01–0.06 and
y is from 0–0.2.

3. A process for producing a pigment as claimed in claim 1, which comprises treating a plateletlike starting pigment having a hematite structure of the composition $Mn_xAl_yFe_{2-(x+y)}O_3$, where x is 0.01–0.06 and y is 0–0.2, at elevated temperatures with a reducing gas until the starting pigment has been fully reduced.

4. A process as claimed in claim 3, wherein the reducing gas used is selected from the group consisting of hydrogen, ammonium, carbon monoxide and methane.

5. A process as claimed in claim 3, wherein the reducing gas contains water vapor.

6. A process as claimed in claim 5, wherein the reducing gas contains water vapor in an amount corresponding to saturation at from 20° to 85° C.

7. A process as claimed in claim 3, wherein the treatment with the reducing gas is carried out at from 200° to 1,200° C.

8. A process as claimed in claim 3, wherein after the reduction the product having a spinel structure of the composition $Mn_uAl_vFe_{(3-[u+v])}O_4$ is oxidized with an oxygen-containing gas.

9. A process as claimed in claim 8, wherein the oxygen-containing gas contains <20% by volume of oxygen.

10. A process as claimed in claim 8 or 9, wherein the oxidation is carried at from 150° to 400° C.

11. A process for producing a pigment as claimed in claim 2, which comprises treating a plateletlike starting pigment having a hematite structure of the composition $Mn_xAl_yFe_{2-(x+y)}O_3$, where x is 0.01–0.06 and y is 0–0.2, at elevated temperatures with a reducing gas and discontinuing the treatment before the pigment has been fully reduced.

12. A process as claimed in claim 11, wherein the reducing gas used is selected from the group consisting of hydrogen, ammonia, carbon monoxide and methane.

13. A process as claimed in claim 11, wherein the reducing gas contains water vapor.

14. A process as claimed in claim 13, wherein the reducing gas contains water vapor in an amount corresponding to saturation at from 20° to 85° C.

15. A process as claimed in claim 11, wherein the treatment with the reducing gas is carried out at from 200° to 1,200° C.

* * * * *